United States Patent [19]

Ashina et al.

[11] Patent Number: 4,578,516

[45] Date of Patent: Mar. 25, 1986

[54] PROCESS FOR PRODUCING DIMETHYLAMINE IN PREFERENCE TO MONO- OR TRIMETHYLAMINE BY VAPOR-PHASE CATALYTIC REACTION OF METHANOL AND AMMONIA

[75] Inventors: Yoshiro Ashina, Zushi; Takeyuki Fujita, Yokosuka; Michio Fukatsu; Junsuke Yagi, both of Yokohama, all of Japan

[73] Assignee: Nitto Kagaku Kogyu Kabushiki Kaisha, Tokyo, Japan

[21] Appl. No.: 607,679

[22] Filed: May 7, 1984

[30] Foreign Application Priority Data

May 13, 1983 [JP] Japan ................................. 58-82768

[51] Int. Cl.$^4$ ............................................. C07C 85/06
[52] U.S. Cl. .................................................. 564/479
[58] Field of Search ......................................... 564/479

[56] References Cited

U.S. PATENT DOCUMENTS

| 4,082,805 | 4/1978 | Kaeding | 564/474 |
| 4,254,061 | 3/1981 | Weigert | 564/480 |
| 4,313,003 | 1/1982 | Weigert | 564/463 |

Primary Examiner—Paul F. Shaver
Attorney, Agent, or Firm—Robert E. Burns; Emmanuel J. Lobato; Bruce L. Adams

[57] ABSTRACT

Catalytic production of dimethylamine in preference to mono- and trimethylamine over a mordenite catalyst is disclosed, which mordenite is characterized by its alkali metal content.

7 Claims, No Drawings

PROCESS FOR PRODUCING DIMETHYLAMINE IN PREFERENCE TO MONO- OR TRIMETHYLAMINE BY VAPOR-PHASE CATALYTIC REACTION OF METHANOL AND AMMONIA

BACKGROUND OF THE INVENTION

1. Field of the Art

This invention relates to a process for producing dimethylamine by the gas phase catalytic reaction of methanol and ammonia. More specifically, the present invention relates to a process for producing dimethylamine having a specific feature in the catalyst employed.

Dimethylamine is an important chemical intermediate as the starting material for various solvents, pharmaceuticals, organic rubbers, surfactants, dyeing aids, etc., and is generally produced by reacting methanol with ammonia in gas phase at an elevated temperature (around 400° C.) in the presence of a solid acid catalyst (hereinafter called the conventional catalyst) having dehydration and amination action such as γ-alumina, silica, silica-alumina and thoria. In this reaction, other than dimethylamine (hereinafter abbreviated DMA), monomethylamine (hereinafter abbreviated MMA) and trimethylamine (hereinafter abbreviated TMA) are also produced almost inevitably, and these by-product amines, for which demand is less than that for DMA, are separated from the reaction product and then transferred to the reaction system for reutilization.

Dimethylamine is separated from the reaction product of methylamines by distillation. However, since TMA forms complicated azeotropic mixtures with ammonia, MMA and DMA, very cumbersome and large scale distillation operations are required, whereby the energy consumption in the DMA recovery process becomes very great. Examples of the recovery process are shown in detail in, for example, "Revised Complete Collection of Manufacturing Flow Chart" (published by Kagaku Kōgyō Sha Co., Ltd., Apr. 25, 1978).

For realization of reduction in production cost of DMA and in the size of the device, it is critically important to suppress formation of the methylamines other than DMA (MMA, TMA), particularly TMA, to a minimum, thereby promoting formation of DMA. However, the final proportion of the three kinds of methylamines formed in governed by thermodynamic equilibrium, and the proportion of MMA and DMA formed will be higher as the temperature becomes higher, and the ratio N/C of the number of nitrogen atoms to the number of carbon atoms in the reaction mixture becomes higher, with the proportion of TMA becoming smaller. For example, when the reaction temperature is 400° C., and the ratio of ammonia to methanol is 1:1 (weight ratio), the equilibrium proportions of the respective amines formed, calculated thermodynamically, are 0.284 for MMA, 0.280 for DMA and 0.436 for TMA.

In the case where the above conventional catalyst is used, the MMA formation reaction or TMA formation reaction is relatively rapid, and therefore the proportion of DMA formed in the three kinds of methylamines throughout the entire reaction region will never surpass this equilibrium value. Thus, large amounts of MMA and TMA must always be recycled together with unreacted ammonia to the reaction system.

Various methods have been known for promotion or suppression of a specific amine among the three kinds of methylamines. For example, by varying the reaction conditions, the level of equilibrium itself can be shifted to control the yield in favor of a specific amine. Generally speaking, as the reaction temperature and the ratio (N/C) of the number of nitrogen atoms to the number of carbon atoms become higher, MMA and DMA will be more advantageously formed. However, as shown in Table 1 set forth hereinafter, the change in the DMA formation ratio at the equilibrium does not greatly depend on the change in the reaction temperature and N/C. At higher reaction temperatures, the amounts of impurities produced such as carbon dioxide, methane, formaldehyde, higher amines, etc. are increased. On the other hand, at higher ratios N/C, the amount of ammonia to be circulated is increased, resulting in enlargement of the apparatus. For the reasons given above, it is not recommended to use reaction conditions outside those generally employed, namely, a reaction temperature of 360° C. to 450° C. and N/C of 1.2 to 3.0.

2. Prior Art

The method of promoting formation of DMA by modifying chemically the conventional catalyst such as silica-alumina has been proposed. For example, Japanese Patent Publication No. 486/1970 discloses a method for improving the yield of DMA by the use of a catalyst based on the silica-alumina impregnated with a sulfide such as that of Re, Ag or Co.

In recent years, as the catalyst for producing a specific methylamine (e.g., MMA or DMA) with high selectivity, various zeolites are coming to the fore of interest. Among them, mordenite type zeolites are also included. For example, Japanese Laid-Open Patent Publication No. 113747/1981 discloses a method for obtaining selectively MMA from ammonia and methanol with the use of various zeolites inclusive of mordenite. Also, Japanese Laid-Open Patent Publication No. 46846/1981 discloses a method for producing DMA from MMA with the use of the same catalyst as mentioned above. Japanese Laid-Open Patent Publication Nos. 148708/1979 and 104234/1980 disclose the method for promoting formation of primary and secondary amines from alcohol and ammonia by the use of the synthetic zeolite FU-1 produced from materials containing a quaternary ammonium salt. U.S. Pat. No. 4,082,805 discloses that primary and secondary amines are obtained preferentially from alcohol and ammonia by the use of the synthetic zeolite ZSM-5 and others.

In any of the methods employing such a zeolite as the catalyst, the proportions of MMA and DMA formed surpass the thermodynamic equilibrium values. This is probably due to the effect of the so-called molecular shape selectivity, resulting from selective blocking of molecules sterically expanded (TMA) at the fine pore inlets, since the sizes of the fine pores within the crystalline structure of zeolite are at the level of molecular sizes.

Zeolites exhibiting shape selectivity for the reaction to form methylamines from ammonia and methanol known in the art are inclusive of mordenite, erionite, clinoptilolite, zeolite A and other special synthetic zeolites. Among them, particularly, mordenite is disclosed to have a marked effect of suppressing formation of TMA in Japanese Laid-open Patent Publication No. 169444/1982.

Mordenite is a crystalline aluminosilicate represented by a formula $Me_{1/n}\cdot(AlSi_5O_{12})\cdot3H_2O$ (where Me is a n-valent metal atom, hydrogen atom, etc.). By the use of mordenite for synthesis of methylamines, the selectivity of TMA is reduced to a great extent, and the selectivity of MMA or DMA is increased. However, mordenite is liable to form coke, and its catalytic properties are very susceptible to influence by coke deposition due to its crystalline structure. For this reason, the synthesis temperature (around 400° C.) poses a problem in the aspect of the catalyst life, and practically it is necessary for prevention of coke formation to carry out the reaction at a temperature not higher than 360° C., preferably not higher than 340° C. Accordingly, a necessary condition for practical use of mordenite is that it has a sufficiently high catalyst activity at such a low temperature.

Me of mordenite is exchangeable with cations such as those of various metals, hydrogen and ammonia, and, depending on these cations and their amounts, the fine pore size and the acidic nature on the fine pore surfaces within the crystalline structure or the acidic nature on the fine pore surfaces based on interstices between the primary particles is influenced, whereby the catalyst activity and the selectivities of the amines vary greatly.

SUMMARY OF THE INVENTION

We have found that, among these cations, particularly Na, K and Li influence greatly the catalyst activity and selectivities of the amines, and that when employing a mordenite catalyst for production of methylamines, in order to maintain a commercially satisfactory reaction rate under the very limited conditions as described above (for example, a reaction temperature of not higher than 360° C., preferably not higher than 340° C.) and yet obtain a sufficiently high selectivity of DMA, while suppressing the formation of TMA and MMA to a minimum, the contents of Na, K and Li must be restricted strictly within specific lower ranges.

The above discoveries we have made are not believed disclosed or suggested in any of the prior art disclosures as enumerated above, which disclose the advantageousness of employing mordenite in the production of methylamines (MMA, DMA and TMA). For example, in the above Japanese Laid-Open Patent Publication Nos. 113747/1981 and 46846/1981, a Na-H type mordenite with Na content of at least 2% by weight (e.g., 2 to 4.3%) is described as a preferable example, and claim 2 of both Publications, showing a preferred embodiment, recommends a reaction temperature within the range from 350° to 400° C.

These are in contrast to the corresponding conditions in the present invention as described hereinafter. Also, Japanese Laid-Open Patent Publication No. 169444/1982 describes the marked effect of suppressing formation of TMA possessed by mordenite from the standpoint of the shape selectivity as described above. However, the main characteristic of the invention disclosed in this Patent Publication resides in use of a mordenite type zeolite having an effective pore size of about 1 to 5 Å, and no particular interest is directed toward the contents of Na, etc., and the reaction temperature is recommended to be within the range of from 350° to 400° C.

An object of the present invention is to provide a mordenite type zeolite catalyst having a content of an alkali metal of the group of Na, K and Li within specifically low, strictly restricted ranges, which can produce a sufficiently high selectivity of DMA, while maintaining a commercially satisfactory reaction rate under the very limited reaction conditions (for example, a reaction temperature not higher than 360° C., preferably not higher than 340° C.) and yet suppressing formation of TMA and MMA to a minimum, in the production of methylamines by the reaction of methanol (or a mixture of methylamines and ammonia, or a mixture of methylamines) and ammonia. The "mixture of methylamines" is a mixture consisting essentially of mono- and trimethylamines.

Another object of the present invention is to provide reaction conditions which can produce a high DMA selectivity during production of methylamines, particularly dimethylamine by the use of such a catalyst.

According to the present invention, there is provided a process for producing dimethylamine with high selectivity by carrying out a reaction (a) between methanol and ammonia, (b) between methanol, ammonia and a mixture of methylamines or (c) between ammonia and a mixture of methyamines in gas phase in the presence of a catalyst, in which process the catalyst is a mordenite type zeolite with an Na content of 0.2 to 3.9 g per 100 g of the catalyst and an alkali metal content of 0.01 to 0.20 mole as a total selected from the group consisting of Na, K and Li per 100 g of the catalyst.

DETAILED DESCRIPTION OF THE INVENTION

In general, with an increase of an alkali metal content in a solid acid catalyst, the reaction rate is lowered. In order to obtain a practical reaction rate at a low reaction temperature (not higher than 360° C., preferably not higher than 340° C.), the amount of the alkali metals must be limited. Also, if the alkali metal content exceeds a certain value, the amount of MMA formed will be abruptly increased to result in a reduction of the proportion of DMA in methylamines formed.

From these facts, the upper limit value of the alkali metal content has been selected as specified above. On the other hand, an H-type mordenite gives a low selectivity when employed as the catalyst. From this standpoint, the lower limit value of Na has been selected.

In a preferred embodiment of this invention, the Na content in the mordenite catalyst is preferably 0.2 to 3.9 g, particularly preferably 0.2 to 3.0 g, most preferably 0.4 to 2.0 and the total content of Na, K and Li in the mordenite catalyst is preferably 0.01 to 0.20 mole, particularly preferably 0.01 to 0.17 mole, most preferably 0.03 to 0.17 mole.

The reaction is conducted preferably at a temperature of 260° to 360° C., more preferably 270° to 350° C., most preferably 280° to 340° C., an N/C of 1.0 to 5.0, more preferably 1.0 to 4.0, most preferably 1.2 to 3.0, an SV of 700 to 5,000, more preferably 800 to 4,000, most preferably 1,000 to 3,000 and a methanol conversion of 80 to 97%, more preferably 85 to 96%, most preferably 90 to 95%. A reaction temperature higher than 360° C. is not desirable, because the catalyst life will be lowered by accumulation of coke as described above (the drawback of the prior art). A reaction temperature lower than 260° C. is also not desirable because it is difficult to maintain a commercially satisfactory reaction rate. It is important to maintain the methanol conversion at 80 to 97% for ensuring high selectivity of DMA. This point is in contrast to the methanol conversion (preferably 97% or higher in most cases) in the case of the catalyst of the prior art. The SV, a space velocity, in hour$^{-1}$, is shown in terms a gas volume at NTP conditions, namely 0° C./1 atm. The other conditions (N/C, SV) are necessary conditions for obtaining DMA with high selectivity and high formation rate under the above conditions.

DESCRIPTION OF THE PREFERRED EMBODIMENT

In order to indicate more fully the nature, utility, and significance of the unique characteristics of this invention, the following specific examples of practice and comparative examples are set forth, it being understood that these examples are presented as illustrative only and are not intended to limit the scope of the invention.

The comparative examples show the results obtained when the reactions were carried out under various conditions with the use of prior art catalysts. In the case of the conventional catalysts, with the reaction temperature of 360° C., the reaction rate is very low, and the reaction rate at this time may be deemed to be the lower limit of a commercially satisfactory rate from the economical standpoint. In short, the level capable of accomplishing about 90% of methanol conversion at an SV of 1,000 corresponds to this limit. This is shown in Run 7 set forth in Table 2. The proportion of DMA formed becomes slightly higher with increase of the temperature and N/C, but the amine yield is lowered at higher temperatures because of increased amount of produced impurities. For these reasons, a temperature around 400° C. is suitable as the reaction temperature. In these catalysts, the proportion of DMA among the three kinds of amines formed coincides with the thermodynamic equilibrium composition as shown in Table 1 at approximately 100% of methanol conversion, and the DMA will never surpass this value in the course of the reaction.

Comparative Example 2 indicates an example in which a catalyst based on a synthetic mordenite is employed. As the synthetic mordenite, it is generally possible to use a commercially available product, but it can also be easily prepared according to a known method, for example, according to the method of Barrer (J. Chem. Soc., 1948, 2158) which comprises crystallization of a gel with a composition of $Na_2O.Al_2O_3.10SiO_2$ by maintaining it under the hydrothermal conditions at 280° C. for 20 hours. The mordenite thus prepared is of Na type and contains about 5.3% of Na. This exhibits substantially no acidity as it is, and its activity is very low. See Run 20 set forth in Table 3. The activity can be abruptly increased by exchange of a part of Na with H. The H.Na mordenite containing 4.1% of Na exhibits an activity on the threshold of a commercially applicable level, with both MMA and DMA exceeding the equilibrium proportions, but the selectivity of the MMA is higher as compared with that of the DMA. See Run 23 set forth in Table 3.

The H-mordenite with Na content of 0.1% has a markedly high activity. See Runs 30 through 33 set forth in Table 3. However, the selectivity of the DMA is low, being slightly in excess of the equilibrium proportion. Mordenites containing metals other than Na and H, for example, those of Li-H type, Runs 34 and 35; K-H type, Runs 36 and 37; and Ca-H type, Run 38, exhibit higher DMA selectivities than H-mordenite, but they are inferior to Na-H mordenites as indicated in the examples set forth hereinafter.

A mordenite with a medium content of Na (0.2%-4%) exhibits a high DMA selectivity, but the reaction rate will be markedly lowered when the total content of K, Li and Na exceeds 0.20 mole per 100 g of mordenite. See Runs 24 through 26 set forth in Table 3.

Comparative Example 3 shows an example of a naturally occurring mordenite in which the amounts of metals were controlled. Here also, a tendency similar to that in Comparative Example 2 is exhibited. A typical naturally occurring mordenite contains about 2% of Na (0.09 mole per 100 g), about 2.2% of K (0.06 mole per 100 g), and other metals such as Mg, Ca, etc. With the increase of an alkali metal such as Na, K or Li in this mordenite, the reaction rate is abruptly decreased, and the selectivity shifted preferentially for the MMA, but the catalyst performance will not be influenced by an increase or a decrease in the amount of Mg or Ca. A mordenite in which most of these metals are removed, namely, the H type natural mordenite has a markedly high activity, but the selectivity of the DMA is low, being nearly the equilibrium value. See Runs 46 and 47. Also, the amount of impurities is relatively large, and the yield of methylamines is low.

Thus, according to any of the processes in which the catalysts of the prior art are used, the DMA selectivity is not higher than the equilibrium value, there being a constant accompaniment of by-production of large amounts of MMA and TMA. In the mordenite catalyst, when the alkali metal content is outside the range as specified in the present invention, the DMA selectivity can exceed the equilibrium only to a small extent, if any, or the reaction rate is markedly lower. Therefore, it is extremely difficult to use such a catalyst practically, and the advantage of use is very small even when put to practical use. In contrast, the Examples set forth below show clearly the effect of the present invention.

Example 1 shows an example of the present invention using a catalyst based on a synthetic mordenite. In a mordenite wherein the Na content is within the range from 0.2 to 3.9 per 100 g of the catalyst, and the total content of Na, Li and K is 0.20 or lower per 100 g of the catalyst, the DMA selectivity is conspicuously high, and the catalyst also maintains a commercially satisfactory high activity. In particular, in the case of an Na content ranging from 0.2% (0.01 mole per 100 g of the catalyst) to 2% (0.09 mole per 100 g) of the catalyst and a total content of Na+K+Li of 0.20 mole or lower per 100 g of the catalyst, as shown in Runs 55 through 61 and Runs 64 through 71 set forth in Tables 5 and 6, the DMA selectivity exhibited is 2-fold or more as compared with that in the case wherein the Na content is less than 0.2 g per 100 g of the catalyst, as shown in Runs 27 through 39 and Runs 46 through 49 set forth in Tables 3 and 4 and the activity exhibited is 2-fold or more, as compared with that in the case wherein the total content of Na, Li and K is more than 0.2 mole or more, as shown in Runs 24 through 26 and Runs 42 through 45 set forth in Tables 3 and 4. The catalyst performance is not substantially influenced by the presence of other metals (Ca, Mg, etc.), provided that the Na content and the total content of Na, K and Li are within the specified ranges. Concerning impurities, such a catalyst contains a very small amount of impurities formed as compared with, of course, the prior art catalyst or even with an H-type mordenite, and a high amine yield is obtained.

As will be apparent from Example 1 and Example 2, in the mordenite catalyst, the proportion of DMA among the three kinds of amines formed surpasses greatly the equilibrium value at 75 to 90% of methanol conversion to exhibit the maximum value. However, it is not desirable from viewpoint of recovery cost to permit a substantial amount of unconverted methanol to remain, and therefore the reaction should be completed at a methanol conversion between 80% and 97%. It is also one of the specific features of the mordenite catalyst that the amount of excessive ammonia can be reduced to a great extent without the proportion of DMA formed being influenced by N/C as much as in the conventional catalyst.

As previously mentioned, since the mordenite catalyst is liable to form carbon and is sensitively influenced thereby, and also for prevention of production of other impurities, it is preferable to conduct the reaction at a temperature not higher than 360° C., preferably not higher than 340° C. Accordingly, the catalyst must have a commercially satisfactory reaction activity even at such a low temperature. Each of the catalysts set forth in the examples exhibits a perfectly satisfactory reaction rate as a commercial catalyst for production of methylamines at a temperature around 300° C.

Example 2 shows an example of the present invention based on a naturally occurring mordenite. Natural mordenites, in general, contain 1.4% to 2.6% of Na, 1.0 to 2.7% of K and other metals such as Ca, K, Fe, etc., their amounts varying depending on the places where they are obtained. A typical natural mordenite contains about 2.0% of Na and about 2.2% of K. This mordenite exhibits a high DMA selectivity but it is not necessarily satisfactory on the point of activity. By removing a small amount of the alkali metals from this mordenite so that their quantities will be of the level of, e.g., 1.7% of Na and 1.6% of K, the activity can be improved to a great extent while retaining the high DMA selectivity. Furthermore, the catalyst performance will be influenced by the presence of other metals (Ca, Mg, etc.) only to a small extent provided that the Na content and the total content of Na, K and Li are within the ranges as specified in the present invention.

Production of undesirable impurities with zeolite catalysts of which the alkali metal contents are controlled in a manner specified in the present invention is smaller than that with H type zeolites.

As described above, the present invention provides a method for producing DMA by a gaseous catalytic reaction of $NH_3$ and methanol using a zeolite catalyst which exhibits the shape selectivity for said reaction, especially when said zeolite catalyst is mordenite type zeolite, where the range of alkali metal content of the catalyst is determined in order to obtain a commercially practical reaction activity and the maximum DMA selectivity, as follows.

An H type mordenite has low DMA selectivity. For obtaining a DMA selectivity markedly higher than the equilibrium composition, the Na content should be 0.2% at least, preferably 0.3% or higher, more preferably 0.4% or higher.

When the Na content is high in excess of a certain level, the activity is abruptly lowered, the DMA selectivity being also lowered. Thus, the Na content should be not higher than 3.9%, preferably 3.0% or lower, most preferably 2.0% or lower.

If the total content of Na, K and Li is high in excess of a certain level, the activity will be abruptly lowered. The total content of an alkali metal of the group of Na, K and Li must be 0.01 to 0.20 mole, preferably 0.01 to 0.17 mole, more preferably 0.03 to 0.17.

The mordenite used in the present invention is a crystalline aluminosilicate represented by the formula $Me_{1/n} \cdot (AlSi_5O_{12}) \cdot 3H_2O$ (Me is an n-valent metal atom or hydrogen) as mentioned above, which may be either a synthetic or a natural product. With respect to Me, there is the limitation as described above.

Comparative Example 1

A ½ B stainless-steel reaction tube of 800-mm length was packed with γ-alumina or a silica-alumina with an alumina content of 18% in the form of pellets of 4-mm diameter, and a mixture of ammonia and methanol containing 50 to 60% by weight of ammonia (N/C 1.9–2.8) was fed into the tube at a rate of 0.5 to 2.0 g per minute (space velocity SV: 500–6,000 liters/hour) to obtain methylamine mixtures with the compositions indicated in Table 2.

Analysis was conducted by gas chromatography with the use of styrene polymer beads (trade name: Polapack Q) impregnated with 3% of KOH.

Comparative Example 2

An Na-type synthetic mordenite prepared according to the method of Barrer was boiled under reflux in 20-fold amount of 3N $NH_4NO_3$ solution for 6 hours, which operation was repeated for 4 times, and then after washing dried at 130° C. for 6 hours, followed by calcination at 450° C. for 3 hours, to obtain an H-type mordenite. By dipping this H-type mordenite in a 5- to 20-fold amount of 0.2 to 4N solution of nitrates or chlorides of Li, Na, K, Mg and Ca and maintaining it at 10° to 80° C. for 4 to 40 hours, or by boiling under reflux in the same solution for 2 to 8 hours, or by repeating or combining these treatments, the amounts of the metals within the mordenite were controlled thereby to prepare various mordenites. For example, by boiling 100 g of the Na-type mordenite in 1.5 liter of 1N $Ca(NO_3)_2$ solution for 2 hours, a Ca—H mordenite containing 1.1% of Ca was obtained.

These mordenites were extruded into cylinders of 3-mm diameter, calcined at 450° C. for 3 hours and provided for use as catalysts. According to the same procedure as in Comparative Example 1, reactions between ammonia and methanol were carried out each at 310° to 400° C., 18 Kg/cm² and SV 1,000 to 5,000 liters/hour thereby to obtain methylamine mixtures of the compositions indicated in Table 3.

Comparative Example 3

A naturally occurring mordenite was crushed, and the amounts of metals were controlled according to the same method as in Comparative Example 2 to prepare variour mordenites. For example, by boiling 100 g of an H-type natural mordenite obtained according to the same method as in Comparative Example 2 in 1.5 liter of 1N $NaNO_3$ for 2 hours, a mordenite containing 2.4% of Na was obtained.

These mordenites were extruded into cylinders of 3-mm diameter, calcined at 450° C. for 3 hours and provided for use as catalysts. According to the same procedure as in Comparative Example 2, reactions were carried out to obtain methylamine mixtures of the compositions indicated in Table 4.

EXAMPLE 1

Various mordenites were prepared containing alkali metals in amounts within the composition ranges as specified in the present invention by controlling the metal contents in the synthetic mordenite according to the method of Comparative Example 1. For example, by treating 100 g of H-type synthetic mordenite in 1 liter of 1N NaNO₃ solution at 40° C. for 20 hours, a mordenite containing 0.4% Na was obtained.

These mordenites were extruded into cylinders of 3-mm diameter. According to the same procedure as in Comparative Example 1, reactions between ammonia and methanol were carried out each at 320° to 360° C., 18 Kg/cm²G and SV 1,000 to 3,000 liters/hour thereby to obtain methylamine mixtures of the compositions indicated in Table 5.

EXAMPLE 2

Various mordenites having the alkali metal contents within the ranges as specified in the present invention were prepared by treating the natural mordenite according to the method of Comparative Example 3. For example, by maintaining 100 g of H-type natural mordenite in 1 liter of a solution of 0.5N NaNO₃ and 1N KNO₃ in admixture at 10° C. for 10 hours, a mordenite containing 0.3% Na and 0.8% K was obtained.

These mordenites were extruded into cylinders of 3-mm diameter and provided for use as catalysts. According to the same procedure as in Example 1, reactions between ammonia and methanol were carried out each at 270° to 360° C., 18 Kg/cm², SV 1,000 to 4,200 liters/hour and N/C 1.2 to 1.9 thereby to obtain methylamine mixtures of the compositions indicated in Table 6.

TABLE 1

| | | | Equilibrium Composition | | | |
|---|---|---|---|---|---|---|
| Temperature (°C.) | Feeding ammonia/methanol N/C (molar ratio) | Equilibrium methanol conversion (%) | Respective methylamines in all methylamines under equilibrium (wt. %) | | | DMA yield DMA g formed / Methanol fed 100 g |
| | | | MMA | DMA | TMA | |
| 400 | 1.9 | 99.6 | 28.5 | 28.1 | 43.4 | 20.0 |
| " | 2.8 | 99.7 | 36.0 | 28.5 | 35.5 | 21.0 |
| 360 | 1.9 | 99.8 | 24.9 | 25.9 | 49.1 | 18.1 |
| 350 | " | " | 24.0 | 25.3 | 50.7 | 17.6 |
| 340 | " | " | 23.1 | 24.7 | 52.2 | 17.1 |
| 330 | " | " | 22.2 | 24.0 | 53.8 | 16.6 |
| 320 | " | " | 21.2 | 23.3 | 55.4 | 16.0 |
| " | 2.8 | 99.9 | 27.2 | 24.6 | 48.1 | 17.4 |
| " | 1.2 | 99.8 | 15.0 | 21.1 | 64.0 | 14.1 |
| 310 | 1.9 | 99.9 | 20.3 | 22.6 | 57.1 | 15.5 |

(*1) Methylamine yield (%) = $\frac{(MMA + DMA \times 2 + TMA \times 3) \text{[moles]}}{(\text{Methanol fed}) \text{[moles]} \times \text{Methanol conversion [--]}} \times 100$ (*2) DMA yield = DMA formed [g]/Methanol fed 100 [g] (Calculated with methylamine yield as 100%)

TABLE 2

| | | | | | Comparative Example 1 | | | | | |
|---|---|---|---|---|---|---|---|---|---|---|
| Catalyst | Reaction Temperature (°C.) | Mole ratio N/C of ammonia and methanol fed | Space velocity SV (hr⁻¹) | Methanol conversion (%) | Proportions of respective methylamines in total methylamines formed (wt. %) | | | Methylamine yield (%) (*1) | DMA yield (g/100 g) (*2) | Run No. |
| | | | | | MMA | DMA | TMA | | | |
| γ-alumina | 400 | 1.9 | 1610 | 99.3 | 26.3 | 26.2 | 47.5 | | 18.4 | 1 |
| | " | " | 2040 | 98.8 | 25.3 | 25.3 | 49.4 | 96.1 | 17.6 | 2 |
| | " | " | 3120 | 97.1 | 23.7 | 23.6 | 52.7 | | 15.9 | 3 |
| | " | " | 5820 | 87.9 | 22.5 | 21.5 | 56.0 | | 13.0 | 4 |
| | " | 2.8 | 2220 | 98.6 | 32.1 | 26.0 | 41.9 | 96.9 | 18.5 | 5 |
| | " | " | 4230 | 95.1 | 31.1 | 25.2 | 43.7 | | 17.2 | 6 |
| | 360 | 1.9 | 1020 | 91.2 | 25.6 | 22.1 | 52.3 | 97.2 | 14.1 | 7 |
| | 340 | " | 1000 | 77.1 | 25.2 | 21.8 | 53.0 | | 11.7 | 8 |
| Silica alumina | 400 | 1.9 | 1700 | 98.7 | 27.2 | 26.3 | 46.5 | 96.4 | 18.4 | 9 |
| | " | " | 2480 | 96.2 | 27.0 | 25.7 | 47.3 | | 17.5 | 10 |
| | " | " | 3450 | 89.8 | 26.7 | 24.1 | 49.2 | | 15.3 | 11 |
| | " | 2.8 | 2020 | 98.3 | 29.8 | 27.1 | 43.1 | 97.1 | 19.1 | 12 |
| | " | " | 4000 | 94.6 | 29.3 | 26.8 | 43.9 | | 18.1 | 13 |
| | 350 | 1.9 | 1110 | 76.8 | 26.5 | 21.2 | 52.3 | | 11.4 | 14 |
| | " | " | 1750 | 61.7 | 27.0 | 18.9 | 54.1 | | 8.2 | 15 |
| | 320 | " | 500 | 88.4 | 26.9 | 20.2 | 52.8 | | 12.5 | 16 |
| | " | " | 710 | 79.2 | 27.5 | 18.5 | 54.0 | | 10.3 | 17 |
| | " | " | 1130 | 71.4 | 29.8 | 17.7 | 52.5 | | 8.9 | 18 |
| | " | " | 1590 | 47.9 | 35.9 | 16.0 | 48.1 | | 5.6 | 19 |

TABLE 3

| | | | | Comparative Example 2 | | |
|---|---|---|---|---|---|---|
| Contents of alkali metals in mordenite | | | | | | |
| Na (wt. %) | K (wt. %) | Li (wt. %) | Total of Na, K, Li (mol/100 g) | Contents of other metals (wt. %) | Reaction temperature (°C.) | Mole ratio N/C of ammonia and methanol fed |
| 5.3 | — | — | 0.23 | — | 400 | 1.9 |
| " | | | " | | " | " |
| 4.8 | — | — | 0.21 | — | 360 | " |
| 4.1 | — | — | 0.17 | — | 350 | " |
| 2.4 | 4.0 | — | 0.21 | — | " | " |

TABLE 3-continued

Comparative Example 2

| | | | | | | |
|---|---|---|---|---|---|---|
| 0.7 | 7.0 | — | ″ | — | ″ | ″ |
| 3.8 | — | 0.3 | ″ | — | ″ | ″ |
| 0.1 | 7.1 | — | 0.10 | — | ″ | ″ |
| ″ | 3.8 | — | 0.19 | — | ″ | ″ |
| ″ | — | — | 0.01 | — | 360 | ″ |
| ″ | — | — | ″ | — | 310 | ″ |
| ″ | — | — | ″ | — | ″ | ″ |
| ″ | — | — | ″ | — | ″ | ″ |
| ″ | — | 0.3 | 0.05 | — | 320 | ″ |
| ″ | — | ″ | ″ | — | ″ | ″ |
| ″ | 0.8 | — | 0.02 | — | ″ | ″ |
| ″ | ″ | — | ″ | — | ″ | ″ |
| ″ | — | — | 0.01 | Ca 1.5 | 330 | ″ |
| ″ | — | — | ″ | Mg 0.3 | ″ | ″ |

| Space velocity SV (hr⁻¹) | Methanol conversion (%) | Respective methylamines in total methylamines formed | | | Methylamine yield (%) | DMA yield (g/100 g) | Run No. |
|---|---|---|---|---|---|---|---|
| | | MMA (wt. %) | DMA (wt. %) | TMA (wt. %) | | | |
| 2380 | 29.2 | 80.1 | 13.7 | 6.3 | | 3.6 | 20 |
| 4620 | 10.8 | 91.5 | 6.8 | 1.8 | 96.7 | 0.7 | 21 |
| 2010 | 47.2 | 72.1 | 16.2 | 11.7 | | 6.6 | 22 |
| 1000 | 83.7 | 51.2 | 32.8 | 16.0 | | 21.9 | 23 |
| 2020 | 58.3 | 50.1 | 32.1 | 17.8 | | 14.8 | 24 |
| 1410 | 71.1 | 42.7 | 29.3 | 28.0 | | 15.9 | 25 |
| 1050 | 79.2 | 49.2 | 33.3 | 17.5 | 97.8 | 20.8 | 26 |
| 1980 | 70.3 | 43.8 | 27.5 | 28.7 | | 14.8 | 27 |
| 2020 | 87.6 | 42.0 | 28.2 | 29.8 | | 18.7 | 28 |
| 4000 | 99.7 | 23.6 | 25.3 | 51.1 | 96.9 | 17.6 | 29 |
| 1530 | 96.1 | 21.5 | 22.6 | 55.9 | 97.9 | 15.0 | 30 |
| 2010 | 95.1 | 23.7 | 23.9 | 52.5 | | 15.8 | 31 |
| 3080 | 87.6 | 26.8 | 26.3 | 46.8 | | 16.3 | 32 |
| 4000 | 73.0 | 34.1 | 29.3 | 36.6 | | 15.7 | 33 |
| 1600 | 93.2 | 22.9 | 28.0 | 49.1 | | 18.2 | 34 |
| 2130 | 76.3 | 24.8 | 31.7 | 43.5 | | 17.1 | 35 |
| 1520 | 95.2 | 24.2 | 26.1 | 49.7 | 97.4 | 17.4 | 36 |
| 3010 | 68.3 | 27.6 | 28.3 | 44.1 | | 13.8 | 37 |
| 1510 | 89.1 | 26.1 | 30.3 | 43.6 | | 19.2 | 38 |
| 1500 | 86.9 | 28.5 | 31.2 | 40.3 | | 19.5 | 39 |

TABLE 4

Comparative Example 3

| Contents of alkali metals in mordenite | | | | Contents of other metals (wt. %) | Reaction temperature (°C.) | Mole ratio N/C of ammonia and methanol fed |
|---|---|---|---|---|---|---|
| Na (wt. %) | K (wt. %) | Li (wt. %) | Total of Na, K, Li (mol/100 g) | | | |
| 4.2 | 0.2 | — | 0.19 | | 360 | 1.9 |
| ″ | ″ | — | ″ | | ″ | ″ |
| 3.3 | 2.9 | — | 0.22 | | ″ | ″ |
| 2.1 | 4.7 | — | 0.21 | | ″ | ″ |
| ″ | ″ | — | ″ | | ″ | ″ |
| 2.4 | — | 0.8 | 0.22 | | ″ | ″ |
| 0.1 | 0.1 | — | 0.01 | | 310 | ″ |
| ″ | ″ | — | ″ | | ″ | ″ |
| ″ | 3.1 | — | 0.08 | | 330 | ″ |
| ″ | 0.1 | — | 0.01 | Ca 1.0 | ″ | ″ |

| Space velocity SV (hr⁻¹) | Methanol conversion (%) | Respective methylamines in total methylamines formed | | | Methylamine yield (%) | DMA yield (g/100 g) | Run No. |
|---|---|---|---|---|---|---|---|
| | | MMA (wt. %) | DMA (wt. %) | TMA (wt. %) | | | |
| 1520 | 70.1 | 54.1 | 31.8 | 14.1 | | 18.0 | 40 |
| 2400 | 58.5 | 62.3 | 26.7 | 11.0 | | 13.0 | 41 |
| 1510 | 65.2 | 49.7 | 33.1 | 17.2 | | 17.1 | 42 |
| 1490 | 70.3 | 44.6 | 32.3 | 23.1 | | 17.5 | 43 |
| 2400 | 58.5 | 48.8 | 29.7 | 21.5 | | 13.6 | 44 |
| 1510 | 71.2 | 43.8 | 34.1 | 22.1 | | 18.7 | 45 |
| ″ | 97.5 | 24.1 | 24.0 | 51.9 | 97.7 | 16.3 | 46 |
| 2410 | 92.8 | 25.8 | 26.3 | 47.9 | | 17.2 | 47 |
| 2400 | 88.3 | 26.4 | 27.5 | 46.1 | | 17.2 | 48 |
| ″ | 90.7 | 29.0 | 28.7 | 42.3 | | 18.7 | 49 |

TABLE 5

Example 1

| Contents of alkali metals in mordenite | | | | | | |
|---|---|---|---|---|---|---|
| Na (wt. %) | K (wt. %) | Li (wt. %) | Total of Na, K, Li (mol/100 g) | Contents of other metals (wt. %) | Reaction temperature (°C.) | Mole ratio N/C of ammonia and methanol fed |
| 3.8 | — | — | 0.16 | — | 360 | 1.9 |
| " | — | — | " | — | " | " |
| " | — | — | " | — | " | " |
| 2.1 | — | — | 0.09 | — | " | " |
| " | — | — | " | — | " | " |
| 0.4 | — | — | 0.02 | — | " | " |
| " | — | — | " | — | " | " |
| 2.0 | 3.7 | — | 0.18 | — | 340 | " |
| 1.8 | — | 0.7 | " | — | " | " |
| 0.3 | 0.4 | — | 0.02 | — | 320 | " |
| " | " | — | " | — | " | " |
| 0.7 | — | — | — | Ca 1.0 | " | " |

| Space velocity SV (hr$^{-1}$) | Methanol conversion (%) | Respective methylamines in total methylamines formed | | | Methylamine yield (%) | DMA yield (g/100 g) | Run No. |
|---|---|---|---|---|---|---|---|
| | | MMA (wt. %) | DMA (wt. %) | TMA (wt. %) | | | |
| 1050 | 96.6 | 35.7 | 37.1 | 27.2 | 98.6 | 26.8 | 50 |
| 2020 | 80.3 | 44.5 | 43.0 | 12.5 | | 27.1 | 51 |
| 3030 | 67.1 | 41.2 | 39.8 | 19.0 | | 20.5 | 52 |
| 1010 | 89.2 | 37.0 | 49.3 | 13.7 | 99.2 | 33.7 | 53 |
| 1420 | 81.5 | 41.1 | 50.5 | 8.4 | | 32.2 | 54 |
| 1400 | 96.8 | 30.7 | 34.1 | 35.2 | 99.0 | 24.0 | 55 |
| 2020 | 90.3 | 34.1 | 39.5 | 26.4 | | 26.6 | 56 |
| 1400 | 82.2 | 39.0 | 54.1 | 6.9 | | 34.6 | 57 |
| " | 86.3 | 43.5 | 42.1 | 14.4 | 98.8 | 28.4 | 58 |
| 1420 | 97.8 | 29.0 | 34.4 | 36.6 | | 24.3 | 59 |
| 3100 | 85.8 | 34.1 | 37.5 | 28.4 | | 23.9 | 60 |
| 1010 | 90.3 | 40.2 | 41.5 | 18.3 | | 28.9 | 61 |

TABLE 6

Example 2

| Contents of alkali metals in mordenite | | | | | | |
|---|---|---|---|---|---|---|
| Na (wt. %) | K (wt. %) | Li (wt. %) | Total of Na, K, Li (mol/100 g) | Contents of other metals (wt. %) | Reaction temperature (°C.) | Mole ratio N/C of ammonia and methanol fed |
| 2.5 | 2.9 | — | 0.18 | — | 360 | 1.9 |
| " | " | — | " | — | " | " |
| 2.0 | 2.2 | — | 0.14 | Ca 1.7 Mg 0.3 | 340 | " |
| " | " | — | " | " | " | " |
| 1.7 | 1.6 | — | 0.11 | Ca 1.1 Mg 0.2 | 320 | " |
| " | " | — | " | " | " | " |
| " | " | — | " | " | " | " |
| " | " | — | " | " | " | 2.8 |
| " | " | — | " | " | " | 1.2 |
| 1.8 | 0.1 | — | 0.08 | " | " | 1.9 |
| 3.7 | 0.1 | — | 0.16 | — | 360 | " |
| 0.3 | 0.8 | — | 0.03 | — | 310 | " |

| Space velocity SV (hr$^{-1}$) | Methanol conversion (%) | Respective methylamines in total methylamines formed | | | Methylamine yield (%) | DMA yield (g/100 g) | Run No. |
|---|---|---|---|---|---|---|---|
| | | MMA (wt. %) | DMA (wt. %) | TMA (wt. %) | | | |
| 1100 | 92.3 | 40.5 | 43.8 | 15.7 | 98.7 | 31.2 | 62 |
| 1520 | 84.1 | 43.2 | 43.1 | 13.7 | | 28.3 | 63 |
| " | 90.4 | 36.1 | 52.4 | 11.5 | | 36.3 | 64 |
| 2010 | 86.1 | 39.3 | 53.0 | 7.7 | | 35.5 | 65 |
| 1500 | 97.9 | 29.9 | 50.2 | 19.9 | 99.2 | 36.5 | 66 |
| 2020 | 94.1 | 33.2 | 53.9 | 12.9 | | 38.5 | 67 |
| 4200 | 77.0 | 40.1 | 52.9 | 9.0 | | 31.8 | 68 |
| 2500 | 92.5 | 42.8 | 52.7 | 4.5 | | 38.6 | 69 |
| 2010 | 91.8 | 27.3 | 54.1 | 18.6 | 98.9 | 36.7 | 70 |
| 2500 | 88.7 | 33.2 | 53.1 | 13.7 | 99.3 | 35.7 | 71 |
| 1100 | 89.3 | 44.5 | 45.1 | 10.4 | | 31.7 | 72 |
| 2500 | 89.8 | 34.4 | 35.7 | 29.9 | 98.8 | 23.8 | 73 |

All of the catalysts used in the reactions in Comparative Examples 2 and 3 and Examples 1 and 2 were confirmed to exhibit the X-ray diffraction pattern of the mordenite crystal shown in Table 7.

TABLE 7

| X-ray diffraction pattern of mordenite | | | |
|---|---|---|---|
| d(A) | I/Io | d(A) | I/Io |
| 2.50 | 50 | 3.99 | 90 |
| 2.87 | 60 | 4.55 | 70 |
| 3.21 | 80 | 5.76 | 60 |
| 3.38 | 80 | 6.54 | 60 |
| 3.46 | 100 | 9.03 | 60 |

Also, with the use of synthetic mordenite (Na 2.1%), the reaction test was conducted for a long time at temperatures of 370° C. and 320° C. As a result, the conversion was lowered by about 10% (from 95% to 85%) after 150 hours, but, in the case of 320° C., substantially no change was observed in the activity over this time interval, and selectivity was also found to be stable. Similar tests were also conducted for the natural mordenite (Na 1.7%, K 1.6%) to obtain similar results.

What we claim is:

1. In a process for producing dimethylamine through a reaction (a) between methanol and ammonia, (b) between methanol, a mixture of methylamines and ammonia, or (c) between a mixture of methylamines and ammonia in gas phase over a solid catalyst, the improvement wherein the solid catalyst is a mordenite type zeolite having an Na content of 0.2 to 2.1 g per 100 g of the catalyst and a total content of 0.01 to 0.20 mole of an alkali metal selected from the group of Na, K and Li per 100 g of the catalyst, and wherein the reaction is carried out at a temperature of 270° to 350° C. and at a methanol conversion of about 80 to 97.9%, thereby to produce dimethylamine in substantial preference to mono- or trimethylamine.

2. The process according to claim 1 wherein the Na content is 0.2 to 2.0 g per 100 g of the mordenite catalyst, and the total content of the at least one alkali metal selected from the group consisting of Na, K and Li is 0.17 mole or less per 100 g of the mordenite catalyst.

3. The process according to claim 1, wherein the mixture of methylamines consists essentially of monomethylamine and trimethylamine.

4. The process according to claim 1, wherein the reaction is carried out at an N/C of 1.0 to 5.0, at an SV of 700 to 5,000 hour$^{-1}$ and a methanol conversion of 80 to 97%.

5. The process according to claim 1, wherein the reaction is carried out at a temperature of 280° to 340° C.

6. The process according to claim 1, wherein the reaction is carried out at a temperature of 280° to 340° C., an N/C of 1.0 to 4.0, at an SV of 1,000 to 3,000 and a methanol conversion of 85 to 96%.

7. The process according to claim 1, wherein the reaction is carried out at a temperature of about 280° C. to 340° C. and an N/C of 1.2 to 3.0.

* * * * *